No. 859,252. PATENTED JULY 9, 1907.
J. W. RENO.
INCLINED ELEVATOR.
APPLICATION FILED SEPT. 6, 1906.
2 SHEETS—SHEET 1.
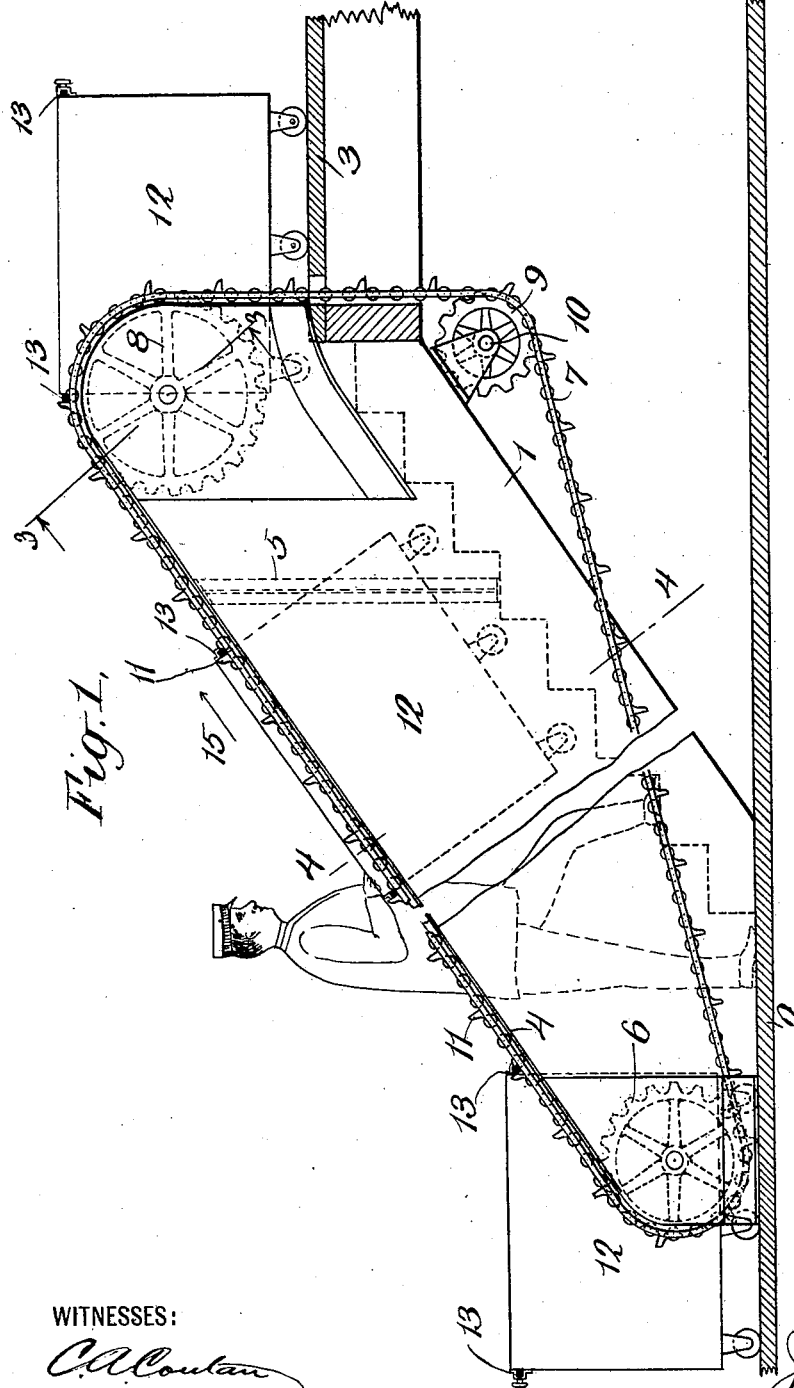
WITNESSES:
INVENTOR
Jesse W Reno
BY
Chas J Earll
his ATTORNEY

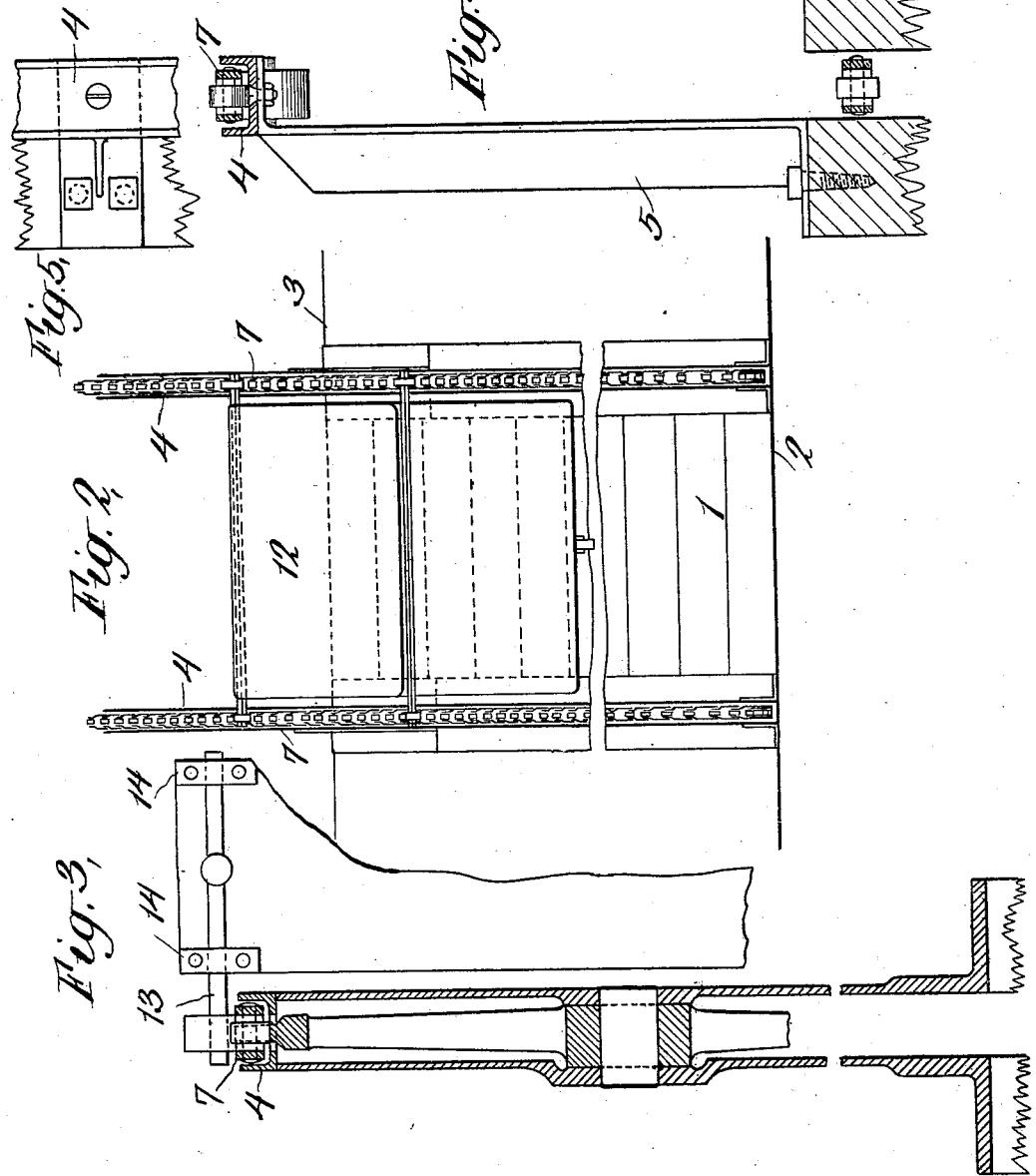

UNITED STATES PATENT OFFICE.

JESSE W. RENO, OF NEW YORK, N. Y.

INCLINED ELEVATOR.

No. 859,252.        Specification of Letters Patent.        Patented July 9, 1907.

Application filed September 6, 1906. Serial No. 333,437.

*To all whom it may concern:*

Be it known that I, JESSE W. RENO, a citizen of the United States of America, and resident of the city, county, and State of New York, have invented certain new and useful Improvements in Inclined Elevators, of which the following is a specification.

My invention relates to inclined elevators for use in department stores and the like in combination with an ordinary stairway, where trucks containing goods have to be transported from one floor to another, accompanied by an attendant, along the stairway.

The object of my invention is to provide an elevator of this class which shall be simple and effective in its construction and operation and which may be readily installed upon an existing stairway without requiring more space than that usually occupied by the stairway, and which shall combine an elevating means for freight or merchandise trucks with an inclined passage or stairway so that an attendant may accompany goods left in his charge while they are being transported by the elevator.

My invention consists in the novel construction and arrangement hereinafter illustrated and described.

In the drawings accompanying and forming a part of this specification, Figure 1 is the side view, partially in section, of one embodiment of my invention; Fig. 2 is a partial front view of the same; Fig. 3 is an enlarged sectional view on lines 3—3 of Fig. 1; Fig. 4 is a partial section on lines 4—4 of Fig. 1; and Fig. 5 is a partial plan view of the parts shown in Fig. 4.

The reference characters are used in the same sense in the drawings and specification.

Numeral 1 represents a stairway of ordinary construction, connecting the lower landing 2 to the upper landing 3. At the sides of this stairway and parallel to the general direction thereof, are arranged the inclined guide rails 4, preferably made of channel bars. These are supported by uprights 5, or in any other suitable manner. At the lower landing a pair of sprocket wheels 6 are arranged in the plane of the guide rails 4 and adapted to receive the endless chains 7, and similar sprocket wheels 8 are arranged at the upper ends of the guide rails. The endless chains 7 pass around the sprocket wheels 6 and 8 over the guide rails 4 and return beneath said guide rails, passing around the driving sprocket wheels 9, which latter are secured to the driving shaft 10, arranged to be driven in suitable manner. The chain 7 is provided with projecting lugs 11.

Numeral 12 represents a truck which is usually provided with four wheels, one arranged at the center of each end and one near the center of each side. Sliding bolts 13 are arranged to operate in the guides 14, secured at the ends of the truck. These bolts are arranged at such height above the bottom of the truck that when they are moved outwardly to their engaging positions, they will be engaged by the lugs 11 as a truck is moved along a landing toward the stairway, and at such height that after engagement has been made the truck will be lifted free and clear above the steps of the stairway as it is conveyed along by the movement of the chains. In the drawings the chain is supposed to move in the direction indicated by the arrow 15; that is the direction in which the chain moves when the trucks are being lifted from the lower to the higher floor. When it is desired to take the trucks from the higher to the lower floor, the direction of the chain is reversed, as will be obvious.

It will be observed that my invention may be easily applied to existing stairways, with small and comparatively inexpensive alterations and that substantially no additional space is required for its installation.

It is one of the essential features of an elevator of this class that an attendant should be able to accompany the truck while it is being taken from one elevation to another. It is the practice in department stores to hold the employees responsible for goods given to their charge for delivery and this can only be done where the employee is permitted to accompany the goods at all times after they have come into his charge.

Having thus described my invention, what I claim is:

1. In an inclined elevator the combination with a stationary inclined passageway, of stationary guides arranged at the sides of and at substantial distance above said passageway, endless chains traveling thereon, guide sheaves arranged at the upper and lower terminals of said guides, a driving shaft extending across and beneath said passageway and beneath said upper guide sheaves and means secured to said shaft adapted to actuate said chains.

2. In an inclined elevator the combination with an inclined passage-way and stationary guides arranged at the sides of said passage-way, of endless chains adapted to travel upon said guides and receptacles for goods having engaging means arranged at such height that their engagement with said chains will cause said receptacles to be lifted bodily above said passage-way while they are being carried by said chains.

3. The combination with a stairway and inclined guides arranged at the sides and above said stairway, of endless chains arranged to travel upon said guides and trucks provided with engaging means adapted to engage said chains.

4. In an inclined elevator the combination with a stairway and stationary rails at the sides of said stairway, of endless chains adapted to travel upon said rails and trucks having engaging means arranged at such height that their engagement with said chains will cause the trucks to be lifted bodily above the stairway while they are being carried by said chains.

5. The combination with a truck provided with engaging means and the stairway, of endless chains arranged to travel at the sides and at such distance above said stairway to carry said trucks clear of the stairway.

6. The combination with a stairway and its landings and trucks provided with engaging means, of guides at the side of said stairway adapted to carry endless chains or belts, endless chains or belts adapted to travel upon said guides, said guides being arranged at such a height in relation to the height of the engaging means upon the truck as to cause the engagement and disengagement of the chains and truck at the landings and to lift the trucks above the stairway at points between the landings.

7. The combination with a stairway, side guides and endless chains traveling thereon, of guide sheaves or sprockets arranged at the upper and lower terminals of said side guides and a pair of driving sprockets adapted to engage said chains respectively mounted on a shaft extending across and beneath the upper terminal of said stairway.

8. In an inclined elevator the combination with a stairway and side guides, of endless chains adapted to travel along said side guides, trucks adapted to travel between said side guides having engaging means projecting beyond the sides of said trucks and adapted to engage said chains.

9. In an inclined elevator the combination of a stairway, side guides and endless chains arranged to travel upon said side guides, of trucks adapted to travel between said side guides, engaging means upon said trucks for engaging said chains and means for throwing said engaging means into and out of operative position.

In testimony whereof, I have signed my name to this specification in the presence of two subscribing witnesses.

JESSE W. RENO.

Witnesses:
ERNEST MILLER,
C. M. WALES.